Nov. 30, 1948. E. H. MEYERS ET AL 2,455,311
CONDUIT CONNECTION FOR TANKS
Filed May 18, 1944 2 Sheets-Sheet 1

INVENTORS
ELLWOOD H. MEYERS and
BY WALTER S. GAINES
Oberlin, Limbach & Day
ATTORNEYS Nov. 30, 1948.  E. H. MEYERS ET AL  2,455,311

CONDUIT CONNECTION FOR TANKS

Filed May 18, 1944  2 Sheets-Sheet 2

INVENTORS
ELLWOOD H. MEYERS &
BY  WALTER S. GAINES

Oberlin, Limbach & Day.
ATTORNEYS

Patented Nov. 30, 1948

2,455,311

UNITED STATES PATENT OFFICE 2,455,311

CONDUIT CONNECTION FOR TANKS

Ellwood H. Meyers, Brecksville, and Walter S. Gaines, Chagrin Falls, Ohio, assignors, by mesne assignments, to Republic Industries, Inc., New York, N. Y., a corporation of Delaware Application May 18, 1944, Serial No. 536,147

6 Claims. (Cl. 285—49)

This application is a continuation-in-part of our co-pending application, Serial No. 390,630, filed April 26, 1941, now Patent No. 2,360,359.

This invention relates to the art of making connection between a conduit, pipe, or the like and a tank, box, vat or other vessel.

In the various arts, when a conduit is threadedly connected to the wall of a vessel, the thickness of the wall is often less than the necessary axial extent of the threads, and a so-called "spud" of suitable thickness is provided, either integral with and a part of the vessel wall or attached to it, and having threads to receive the conduit.

Also, vessels often contain material, for example, liquid, which is corrosive with respect to the vessel wall and spud, and the wall and spud are accordingly painted or otherwise coated with a non-corrosive coat, the coat being continuous from the wall of the vessel outwardly over the spud wall and out to the conduit-receiving spud threads. But it is generally impracticable to insure that the non-corrosive coat will extend uninterruptedly entirely to the threads, or that the threads themselves will be so tightly sealed as to prevent corrosive liquid from entering them. It follows that such coats fail of their main purpose of preventing access of the corrosive liquid to bare metal, because bare metal is exposed to its action either on the threads themselves or on the spud surfaces adjacent the threads.

The present invention has been made to solve this problem generally, and, in particular, to provide a solution applicable to the attachment of conduits to vessels, the walls of which are coated with vitreous enamel, typical of which are the enamelled hot water tanks used to supply hot water to a domestic or like water system.

It is desirable, in enamelled tank fabrication, to attach separately formed spuds to the tank wall, and it is known that this can most advantageously be done by electric resistance or electric flash welding, but the attachment of spuds to tanks of the enamel-coated class, in a leak-proof and pressure-proof manner, introduces problems the solution of which is not obvious and many attempts have been made to provide a satisfactory spud and means of attaching it to the tank wall in such cases.

Some structure means or method must be provided to insure that the enamel coat, particularly on the inside of the tank, will form solidly and completely over the spud surfaces and tank wall surfaces adjacent thereto, and not leave bare metal exposed to the corrosive action of the hot water or other contents of the tank; and the threads of the spud must be left free from enamel slip so that fused enamel will not form thereon; and in this connection the spud must be attached to the tank wall in such manner that the enamelling of the tank and the surfaces of the spud may be performed after the spud is attached; and the outside diameter of the spud and its zone of connection with the tank wall must be relatively large because when a conduit has been connected to it, the conduit is in the nature of a lever and even a slight side thrust thereon which may inadvertently be given to it by the plumber installing it, will, because of the leverage, bend the wall to which the spud is attached and crack the enamel coat, but at the same time, the mass of metal in the spud at such large outside diameter must not interfere with the welding of it to the relatively thin wall of the tank; and at the juncture of the spud with the tank wall, all surfaces that are to be enamelled must either be planar or must be curved on sufficiently great radii as to cause the enamel to form continuously and solidly, and such surfaces should preferably be inherent in the structure so as not to require reaming or grinding or rounding metal-working operations.

The invention comprises in general, besides the spud proper or thick portion of the vessel wall having threads into which the threaded conduit is screwed, a non-corrosive insert formed of such material as to render it susceptible of being molded into intimate sealing engagement with the non-corrosive coat of the vessel or spud to seal off the non-corrosive coat on an unbroken area of the coat and inwardly of the spud threads; and which is also susceptible of having supplemental threads formed thereon after it is assembled with the threaded spud which supplemental threads are in continuation with the spud threads and into which also the conduit is screwed and which seal off the conduit threads inwardly of the spud threads. Thus no corrodible part of the vessel is exposed to corrosive contents of the vessel except the inner end of the conduit itself and if desired it also can be made of corrosion-proof material.

It is among the objects of the invention:

To provide generally an improved conduit connection for tanks, and other vessels;

To provide generally an improved connection for joining a conduit to a coated vessel in communication with its interior;

To provide a spud connection for vessels of the type comprising a threaded conduit receiving spud welded to the vessel wall and in which both the spud and the vessel wall may be coated completely and solidly with enamel;

To provide a conduit spud connector of relatively large diameter which may be welded to a vessel wall on a small welding area in an improved manner;

To provide in a conduit connection for enamelled vessels an improved construction whereby at the juncture of the spud and vessel wall, surfaces of large radius may be provided in an improved manner to insure the formation thereon of a solid coat of enamel;

To provide a conduit connection for vessels having corrosion-proof coated walls, comprising an insert element for effecting in an improved manner the sealing-off of the inner coat of the vessel and the sealing off of the conduit threads;

To provide an improved method for making a welded juncture between a spud and a tank wall to facilitate the coating of spud and the tank wall.

Other objects will be apparent to those skilled in the art to which our invention appertains.

Our invention is fully disclosed in the following description taken in connection with the accompanying drawing in which.

While the present invention may be applied, to advantage, to vessels of various kinds, it will be described more particularly herein as applied to enamel coated tanks, to which separately formed spuds are attached; inasmuch as this is one of its more important uses. The invention has been illustrated with tank walls coated both inside and outside with enamel but as will become apparent hereinafter the outside enamel coat may be omitted if desired. The inside enamel coat of the tank is provided primarily for the purpose of preventing corrosion of the tank wall by the contents of the tank. Typical of such tanks are the hot water tanks used as reservoirs for hot water in domestic water systems, and as is well-known the hot water has corrosive action on the walls of the tank for purposes of economy they are made from steel. Commerce demands a conventional form of tank comprising a cylindrical tubular body, and heads at the ends of the body, and spuds for conduit connections to the tank are provided at various points on the body wall and on the heads. The spud connection herein described may be applied either to the body wall or to the head walls and for simplicity of illustration herein we have chosen to illustrate it in connection with the body wall and in connection with a tank the walls of which are made of steel.

Figure 1:
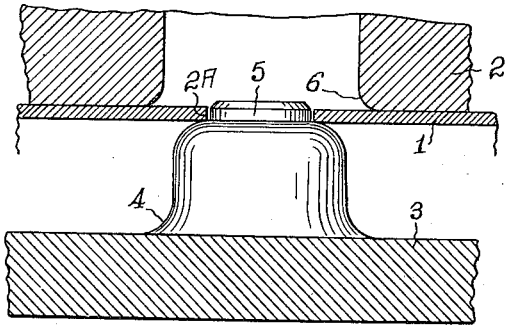
Fig. 1 is a longitudinal sectional view to approximately full scale of a part of the wall of a vessel and a pair of die elements in the positions which they assume preparatory to performing a metal working operation on the vessel wall at the point to which a spud connector is to be attached according to our invention.
Figure 2:
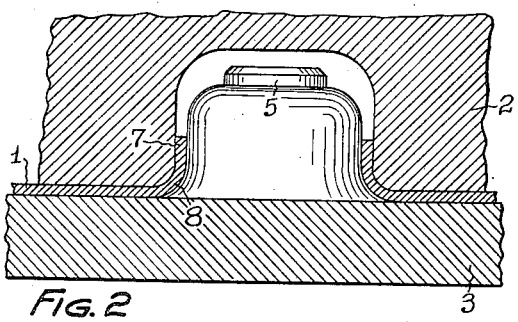
Fig. 2 is a view similar to Fig. 1 but with the die parts in a subsequent position and with the metal working operation partly performed.
Figure 4:
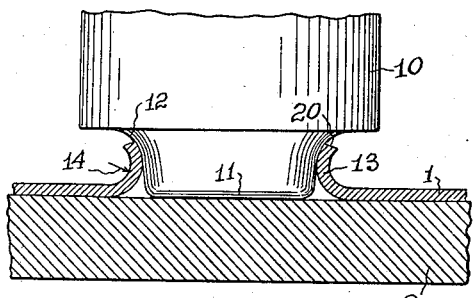

Referring to Fig. 1 of the drawing we have shown at 1 a fragment of the body wall of a tank and the body 1 is provided with a perforation 2A. A metal working operation is performed upon the metal of the body at the perforation as follows. A pair of dies 2 and 3 is provided, the lower die 3 having an annular concave rounded die surface 4, and on its upper portion having a pilot portion 5 of substantially the diameter of the perforation 2A. The upper die element 2 has an annular convex rounded portion 6 corresponding to the portion 4. The tank wall 1 is telescoped over the lower die 3 and the pilot 5 inserted in the perforation to position it, and then the two die elements 2 and 3 are moved forcibly together by a press or the like and they take up the positions illustrated in Fig. 2, bending and drawing the metal adjacent the perforation 2A into the form shown in Fig. 2, where, as will be seen, it takes the form of an outwardly projecting tubular portion 7, joined to the body 1 by a connecting portion 8, the die-formed curvature of which is of relatively large radius compared with the thickness of the metal of the body 1.

Figure 3:
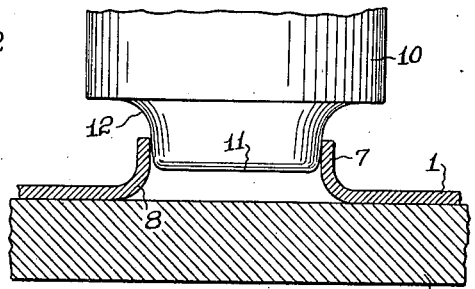
Figs. 3 and 4 are views of another pair of die elements in successive positions which they occupy in completing the metal working operation initiated by the die elements of Figs. 1 and 2.

The dies 2 and 3 are then withdrawn from each other and the body of the tank removed therefrom and placed upon another lower die element 9, as shown in Fig. 3 disposed directly under an upper die element 10 having a downwardly projecting die portion 11, which has an annular concave rounded die portion 12, the die portion 11 substantially fittting the tubular formed portion 7. The die elements 10 and 9 are then forced toward each other by a press or the like, and the portion 12 of the upper die continues the metal working operation of the body, leaving the metal as shown at 13 in the form of an outwardly projecting tube which, proceeding axially there along, outwardly from the body 1, tapers first inwardly and then outwardly, the tapers as shown being continuous one into the other and being curved on a relatively large radius 14; the tube 13 thus being of smaller diameter in its intermediate portions than in portions farther outward axially.

Figure 5:
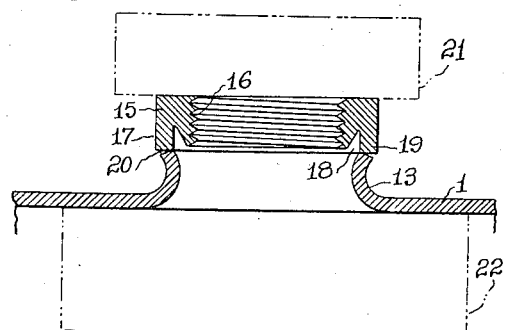
Fig. 5 is a view illustrating the wall of the vessel upon which the metal working operation has been performed and illustrating a spud body embodying a part of our invention associated therewith in position to be welded thereto and illustrating the welding electrodes in broken line.

This outwardly drawn tube 13 is reproduced in Fig. 5 wherein also is shown the body 15 of the spud. This spud body is generally in the form of a thick disc with a threaded opening 16 therethrough, the threads being taper or pipe threads to receive a threaded conduit as will appear later, and between the threads 16 and the outer periphery 17 of the body is formed a groove 18 which leaves an annular peripheral edge 19.

The annular edge 19 of the spud body 15 is welded to the outer edge 20 of the tube 13, the parts being positioned for this operation as shown in Fig. 5. Welding electrodes 21 and 22 are disposed, one upon the spud and the other upon the inner wall of the body 1, and the parts are pressed together while electric current is passed therethrough and the weld thereby effected. After the spud body 15 and the tube 13 have been thus welded together they appear as in Fig. 6.

In this connection it may be stated that while the body wall 1, at the time of forming the tube 13 is cylindrical, the die elements 2, 3, 9, and 10 form the tube 13 so that its upper edge 20 is substantially in a plane whereby the peripheral edge 19, engaged therewith for welding the two together, may be planar.

As mentioned hereinbefore, any number of such spud bodies 15 may be, in a similar manner, welded to similar tubes 13 on the body wall or on the heads of the body not shown; and after such spud bodies have been welded on as described, the tank body, the heads and the spuds are coated with vitreous enamel, which may be on the inner walls of the tank and spuds or upon both the inner and outer walls.

Figure 6:
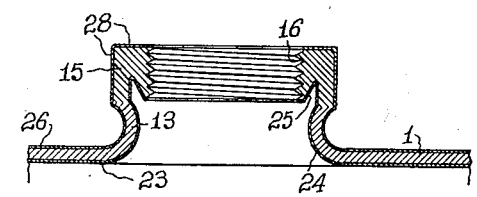
Fig. 6 is a view similar to Fig. 5 but illustrating the spud body after it has been welded onto the vessel wall and after both the tank body and the spud body have been coated with vitreous enamel.

When both the inner and outer walls have been enamelled, the spud preferably appears as in Fig. 6, wherein the inner coat is shown at 23 on the body 1, extending outwardly over the tube 13 as at 24 and over the wall of the groove 18 as at 25 and out toward the threads 16; and on the outer wall of the body as at 26, extending over the tube 13 as at 27 and over the outside of the spud body as at 28 and toward the threads 16.

It is desirable to prevent enamel from forming on the threads, and to this end, when the wet enamel slip is applied preparatory to forming the enamel coat, and has dried, it may be removed from the threads 16 by brushing it off therefrom; or by screwing a tap thereinto; or by screwing in a plug before applying the wet slip and taking it out after the slip is applied.

Figure 7:
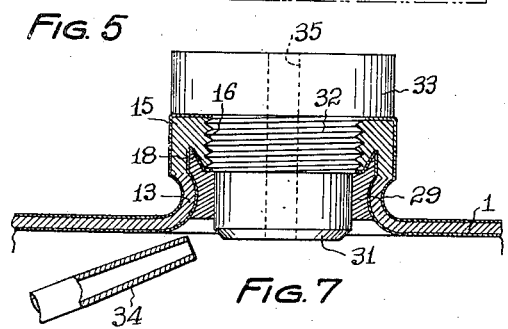
Fig. 7 is a view of the parts of Fig. 6 and illustrating an insert element constituting part of the spud connector in its preferred form and the method of applying the insert element.
Figure 8:
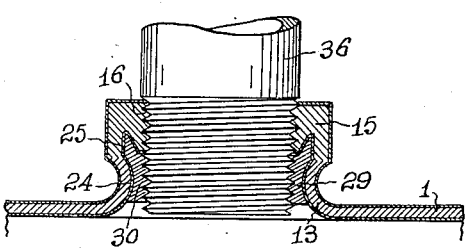
Fig. 8 is a view similar to Fig. 7 illustrating threads which have been formed on the insert element continuous with threads on the spud body element and illustrating a conduit screwed into the spud threads.

After the enamel coats have thus been applied, an insert 29, Figs. 7 and 8, is added to the spud as an element thereof. For the present description this insert may be considered as of soft metal; other suitable materials will be referred to later. The insert 29 is first molded into the spud structure as shown at Fig. 7 and subsequently is threaded as shown in Fig. 8 with a supplemental thread 30 continuous with the thread 16 of the spud. This insert 29 is applied by pouring a quantity of molten metal into the tubular portion 13 described above, and to avoid the necessity of having to drill a hole therein upon which the threads 30 may be formed, a hole may be molded in the insert. One means for accomplishing this result is illustrated in Fig. 7. A molding plug 31 of cylindrical form, provided with threads 32 fitting the threads 16 of the spud body, and having a head 33, is screwed into the spud by turning the head 33, so that the molten metal will flow around the plug 31, and the plug 31 may have draft whereby it may be removed after the metal solidifies. At the time of applying the molten metal for the insert, the body and spud may be turned upside down with respect to their position in Fig. 7, and the molten metal may be conducted through a conduit 34 which has been projected into the body through another spud opening on the body or on a head and with the end of the conduit adjacent the tube 13, to discharge the molten metal into the space around the plug 31; or the molten metal may be injected through a bore 35 in the head 33 of the plug and axially through the plug and caused to flow over the end of the plug and into the space between the plug and the tube 13.

When the insert 29 has solidified, and the plug 31 has been withdrawn, the insert is maintained within the spud structure by its interlock with the convex configuration of the tube 13 upon which it is, as will be apparent, molded, and is further interlocked by its being molded into the groove 18, the interlock preventing its displacement. After removal of the plug 31 a tap or the like is screwed into the threads 16 of the spud body and cuts threads on the insert 29 as shown in Fig. 8.

Any suitable alloy for the insert may be employed, one such alloy being tin and lead, 50% each. Other alloys may be utilized and a metal alloy which expands upon solidifying may be employed if desired, such alloys being well-known in the art. The alloy in any case is preferably one which has no chemical reaction with the enamel coat in engagement with it.

The spud connection is now complete and a conduit such as that shown at 36 in Fig. 8 may be screwed thereinto and will make leak and pressure proof juncture with the insert 29, or with the insert and the body 15, on the threads thereof. The insert besides performing the function of making a pressure and liquid-tight seal at its threads 30 with the threads of the conduit 36, performs another important sealing function. The metal of the insert being molded and solidified on the enamel at 24 and 25 as above referred to, makes intimate sealing contact therewith and prevents corrosive liquid or the like, even if under pressure, from creeping over the enamel to the threads 16 even if the enamel coat does not extend all the way to the threads. It will be understood that, as mentioned above, it is desirable that there be no enamel on the threads of the spud body 15, and that the dried slip, before fusing it, is removed therefrom; but it is impracticable to insure that the enamel coat will extend entirely to the threads and stop there, so that without the insert 29, when the conduit 36 has been screwed into the body 15 of the spud, there would inevitably be bare metal exposed on the spud adjacent the thread 16 which would be attacked by the corrosive liquid; but by employing the insert 29, even if there be bare metal at such point, the liquid cannot reach it, being sealed off therefrom by the insert. The metal of the insert 29 itself is not subject to corrosion by the liquid in the tank if a suitable alloy be employed therefor, and as would be the case with the alloys mentioned above.

It follows that with the spud structure described above, after the conduit 36 has been screwed thereinto, no bare corrodible metal is exposed to the action of liquid in the tank except that of the conduit 36 itself, if it be of corrodible material, and to render the entire system corrosion-proof, the conduit 36 may be of non-corrodible metal such as is well-known for such purposes.

It will be observed also that the outside diameter of the spud structure thus made as a whole is relatively large and mechanically rigid and strong, so that lateral thrusts on the conduit 36 which will inevitably be exerted thereon by a plumber installing the conduit in the spud connection, will not bend the spud connection out of its initial position with the undesirable result of bending the metal at its juncture with the tank wall and consequently cracking the enamel coats thereon.

The insert 29 therefore effects both on its radially outer and on its radially inner parts, a liquid and pressure-proof seal to prevent corrosive liquid from creeping outwardly either along the inner enamel coat or along the threads of the conduit.

Figure 9:
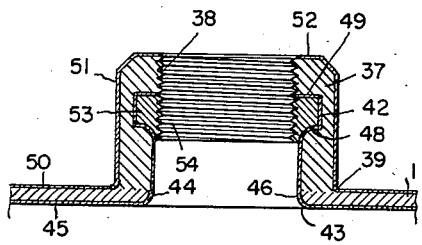
Figs. 9 to 13 are respectively alternative embodiments of my invention, each having in common, however, the basic features of the structure illustrated for example in Fig. 8.

In Fig. 9 we have illustrated a modification of our invention, which in some cases it may be preferable to employ, inasmuch as, with this form, the outwardly projecting tube 13 is not required.

Referring to this figure, in which again the conduit connection or spud structure is associated with the wall of the tank body, the spud body 37 having conduit receiving threads 38, is welded as at 39 to the body 1. The spud body 37 is generally of tubular form as illustrated, and on the inner wall thereof is provided with a groove 42 before it is welded on as described.

The body 37 is in alignment with a perforation 43 in the body, which perforation may be made before the spud body is welded on, or may be punched out of the body wall after the spud body is welded on, whichever method is preferred. The periphery of the perforation 43, preferably after the weld has been made, is rounded off as shown at 44, to insure that an enamel coat will form continuously and solidly thereon; and the body 1 and spud body 37 are coated with enamel, the inner enamel cost 45 continuing outwardly over the rounded edge 44 as at 46, upwardly along the inner wall of the spud as at 47, and over the wall of the groove 42 as at 48 and inwardly toward the threads 38, as at 49; and the outer enamel coat 50 extending upwardly over the spud body as at 51, and inwardly toward the threads 38 as at 52. The enamel slip from which the enamel coat thus described is fused, is, as usual, first applied and dried, and the threads may be kept free from enamel as described above.

After the enamel coat has been formed, an insert 53 of soft metal is molded in the groove 42, and may be molded therein by any suitable means, that preferred being the one more completely described in connection with the above first-described form of the invention.

The insert has threads 54 formed or cut thereon by a tap or the like, continuous with the threads 38 on the spud body.

Figure 10:
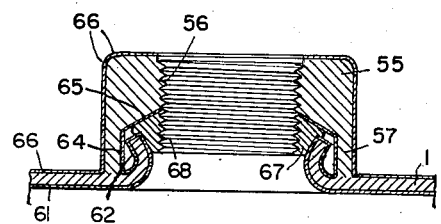

In the modification of Fig. 10, the tube 13 is first formed on the body 1 as described for the form of Figs. 1 to 8. A spud body 55 is provided, generally of tubular form, and having pipe threads 56 formed thereon, and on its outer periphery is provided with a depending skirt 57. In this form, the spud is welded to the body proper, instead of to the edge of the tube 13. The parts are enamel-coated with an inner coat 61. This inner coat covers all of the surfaces of the projection 62. The outer coat 66 covers the tank body 1, and the outer walls of the spud body toward the threads 56. A soft metal insert 67 is formed in the structure and threads 68 formed thereon continuous with the threads 56.

This insert 67 like the insert 53 of the form of Fig. 9 is molded into and interlocked with the structure so that it cannot become displaced, the aforesaid insert 53 being molded into the groove 42 formed in the spud body 37, and the insert 67 being interlocked by what in effect is a groove 69 formed by the wall of the spud body and the inner surface of the tube 13, and these inserts perform the functions described for the corresponding insert 29 of Figs. 1 to 8 above described.

Figure 11:
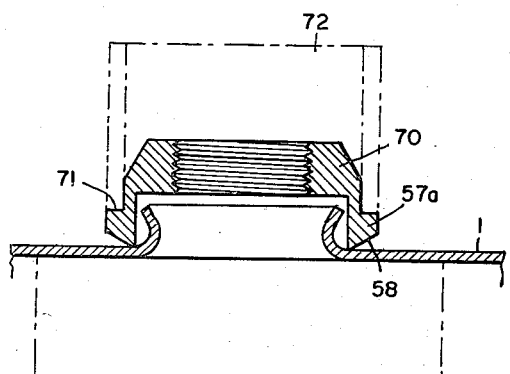

In Fig. 11 is shown a modification of the spud body shown in Fig. 10, this body 70 having an annular shoulder 71 formed on the outside of the spud body, and the upper electrode 72 instead of engaging the outer end of the spud body as in the form of Fig. 10 engages the said shoulder 71, and this shoulder being adjacent the lower end of the skirt 57a, the lower end 58 of the skirt will be brought to welding temperature with a minimum of welding current. Otherwise the construction indicated by Fig. 11 will be welded, enamelled and provided with a threaded insert, in the same manner as in connection with the form of Fig. 10.

Figure 13:
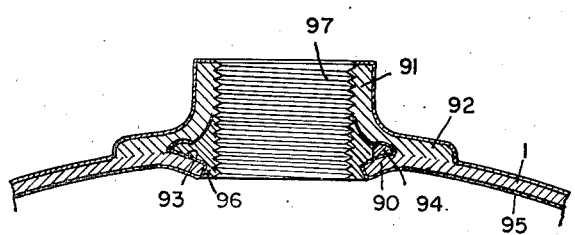

In the modification illustrated in Fig. 13, the body 1 of the tank is provided with a coniform inwardly extending portion 90 around the opening. Affixed to the outer face of the wall as by welding in accordance with any of the modes previously explained and preferably centrally of the opening in the wall is a metallic annulus 91 provided with a flanged portion 92 with which the welded connection is made. At one or more points circumferentially spaced about the annular space 93 is a fillet 94 which may be provided conveniently by locally depositing small amounts of weld metal as for example from a fusible welding electrode. The inner coating 95 extends about the coniform end 90 of the wall 1 and the molded insert 96 is in overlying relation to said coating. Continuous pipe threads such as 97 are formed on the molded insert and the outer end of the annulus 91. The provision of the fillets 94 cooperating with the local area of enlarged diameter, in which the molded insert 96 is contained, securely lock the insert and the welded assembly against relative movement in both the axial and circumferential direction. It is within the contemplation of this invention to provide fillets such as 94 in any of the structures illustrated in any of the remaining figures. The radial inward extent of the fillet should be such as to leave a substantial amount of the molded insert material between the threads and the fillet.

From the foregoing it will be apparent that the insert is particularly advantageous when the tank or vessel wall and the spud are enamel-coated; but it will also be apparent that the insert will perform its described functions if the vessel and spud are otherwise coated for example by plating.

Whatever the type and character of the coat, it will be observed that in the connection structure there is generally a pocket on the tubular spud body at the outer end of which is a thickened threaded portion (the threaded spud) to receive the conduit; and that there is a recess laterally of the thread axis, and that an annular insert is trapped in the pocket and interlocked therewith and sealed upon the coat; and has supplemental threads in it continuous with the first-named threads. As stated, this continuous thread is a taper thread, contemplating the screwing thereinto of a conduit having a taper thread cut thereon in the usual manner, and if desired, the taper thread on the insert may be of slightly smaller diameter than that of those convolutions of the thread which are on the spud proper, whereby when the conduit is screwed in it will be propelled inwardly by the threads on the spud proper and caused to tightly engage and seal upon the threads of the insert.

It will be apparent furthermore that the liquid and pressure sealing functions of the insert effected on its radially outer periphery and on its radially inner threads, as described, may be considered as independently of and separable from the functions of the insert to seal against corrosion, and that therefore the advantages of the sealing function may be enjoyed when it is applied to tanks which are not coated at all, and not intended to contain corrosive contents, and in which therefore the primary function of the insert is to effect merely liquid and pressure seal.

Figure 12:
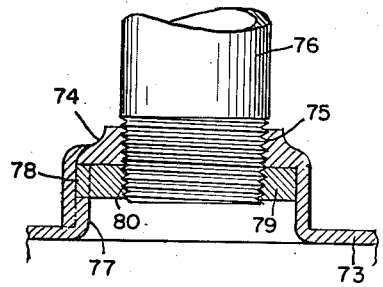

This broader concept of the invention is illustrated in Fig. 12. Here the wall of the vessel, 73, is integral with the thickened portion 74 thereof having threads 75 into which the conduit 76 is screwed, as would be the case if the vessel wall were, for example, made of cast metal. A pocket 77 is formed inwardly of the conduit threads 75, and has a recess 78 formed in the wall of the pocket. The insert 79 is molded into the pocket and recess and has supplemental threads 80 continuous with the threads 75. A separate attached spud is not employed here, and the walls are not coated, and the recess is not annular.

As to the material of the insert, while metal alloy is preferred as described above, other materials may be utilized which are susceptible to being pressed or expanded or molded into the structure and interlocked therewith sufficiently to prevent displacement; and which are susceptible to having threads formed thereon. Such materials include synthetic resins, tars, waxes, packings, plastics, etc.; and in the case of some such materials the interlock referred to may be effected by cement between the insert and the adjacent wall surface instead of by a molding recess as described.

When a metal alloy is employed for the insert the threads may be cut thereon as described; or they may be cut thereon at the same time and by the same operation which cuts the threads 16 in the spud body 15; or they may be molded in the insert by pouring the molten metal around a threaded plug. In this connection, the plug 31 of Fig. 7 would be threaded instead of cylindrical, and the metal of the insert 29 would be molded with threads corresponding thereto in the nature of a die casting. And in the case of the other materials mentioned above, the threads can be molded or cut or otherwise formed, in situ or not, as will occur to those skilled in the art in accordance with the insert material utilized, without the necessity of further illustration or description herein.

Obviously the conduit itself may be made from any desired material determined by the nature and intended uses of the tank, vat, box, trough or other vessel to which it is connected and by the character of the contents of the vessel.

While we prefer to carry the enamel coat over the tube 13 and over the spud skirt and body and on toward the threads, it will be apparent that the enamel coat need not in all cases be carried that far; it may terminate for example on the tube 13. The essential feature is that the insert shall overlap the enamel coat to a substantial extent sufficient to effect a seal between the coat and the insert. The extent of the enamel coat in the structure may thus be varied to a degree without departing from the spirit of our invention.

Other modes of applying the principle of the invention may be employed, change being made as regards the details described, provided the features stated in any of the following claims or the equivalent of such be employed.

We, therefore, particularly point out and distinctly claim as our invention:

1. A conduit connection for a vessel wall, comprising an extension on the face of said wall about an opening therein, such extension providing a passage with its axis extending at an angle to the plane of said wall, an insert adherently molded and solidified in said passage, and a continuous pipe thread formed in part on said extension and in part on said molded insert.

2. A conduit connection for a vessel wall, comprising an extension on the face of said wall about an opening therein, such extension providing a passage with its axis extending at an angle to the plane of said wall, a corrosion resistant coating on the inner face of said wall and extending outwardly over the inner surface of said passage, an insert of corrosion resistant material adherently molded and solidified in said passage in overlying relation bonding and sealing with said corrosion resistant coating, and a continuous pipe thread formed in part on said extension and in part on said molded insert.

3. A conduit connection for a vessel wall, comprising an annular extension on the face of said wall about an opening therein, such extension providing a substantially cylindrical passage with its axis extending at an angle to the plane of said wall, a corrosion resistant coating on the inner face of said wall and extending outwardly over the inner surface of said passage, an annulus of corrosion resistant material adherently molded and solidified in said passage in overlying relation bonding and sealing with said corrosion resistant coating, and a continuous pipe thread formed in part on said extension and in part on said molded annulus.

4. A conduit connection for a vessel wall, comprising an annular extension on the outer face of said wall about an opening therein, such extension providing a substantially cylindrical passage with its axis extending at an angle to the plane of said wall, a corrosion resistant coating on the inner face of said wall and extending outwardly over the inner surface of said passage, an annulus of corrosion resistant material adherently molded and solidified in said enlarged local area in overlying relation bonding and sealing with said corrosion resistant coating, such molded annulus interlocked mechanically with the inner surface of said passage, and a continuous pipe thread formed in part on said extension and in part on said molded annulus.

5. A conduit connection for a vessel wall, comprising an annulus welded to the outer face of said wall about an opening therein, such welded assembly providing a substantially cylindrical passage with its axis at substantially right angles to the plane of said wall, with an intermediate local area of such passage having an enlarged diameter, a corrosion resistant coating on the inner face of said wall and extending outwardly over the inner surface of said passage to the extent of at least a portion of said enlarged area, an annulus of corrosion resistant material adherently molded and solidified in said enlarged local area in overlying relation bonding and sealing with said corrosion resistant coating, and a pipe thread formed on the outer portion of said first named annulus and said molded annulus.

6. A conduit connection for a vessel wall, comprising an annulus welded to the outer face of said wall about an opening therein, such welded assembly providing a substantially cylindrical passage with its axis at substantially right angles to the plane of said wall with an intermediate local area of such passage having an enlarged diameter, a corrosion resistant coating on the inner face of said wall and extending outwardly over the inner surface of said passage to the extent of at least a portion of said enlarged area, an annulus of corrosion resistant material adherently molded and solidified in said enlarged local area in overlying relation bonding and sealing with said corrosion resistant coating, the inner surface of said passage so formed as to mechanically interlock with said molded insert securing the parts against both radial and axial relative movement, and a pipe thread formed on the outer portion of said first named annulus and said molded annulus.

ELLWOOD H. MEYERS.
WALTER S. GAINES.

REFERENCES CITED

The following references are of record in the file of this patent:

UNITED STATES PATENTS

| Number | Name | Date |
| --- | --- | --- |
| 324,598 | Shelton | Aug. 18, 1885 |
| 670,584 | Fowle | Mar. 26, 1901 |
| 1,787,513 | Cromwell | Jan. 6, 1931 |
| 2,156,237 | Draper | Apr. 25, 1939 |
| 2,220,893 | Dodson | Nov. 12, 1940 |
| 2,254,005 | Dodson | Aug. 26, 1941 |
| 2,266,611 | Martin | Dec. 16, 1941 |
| 2,290,619 | Riegen | July 21, 1942 |
| 2,356,901 | Wackman | Aug. 29, 1944 |
| 2,360,359 | Meyers | Oct. 17, 1944 |
| 2,361,636 | Koppel | Oct. 31, 1944 |
| 2,362,983 | Bodnar et al | Nov. 21, 1944 |